United States Patent [19]

LoPinto

[11] Patent Number: 4,549,308
[45] Date of Patent: Oct. 22, 1985

[54] SECURE MOBILE RADIO TELEPHONY

[75] Inventor: Frank J. LoPinto, Chicago, Ill.

[73] Assignee: AT&T Bell Laboratories, Murray Hill, N.J.

[21] Appl. No.: 397,131

[22] Filed: Jul. 12, 1982

[51] Int. Cl.$^4$ ............................................. H04L 9/00
[52] U.S. Cl. .................................. 455/26; 178/22.14
[58] Field of Search ............... 455/26, 27; 179/1.5 R; 178/22.07, 22.08, 22.12, 22.14, 22.17; 340/825.34; 235/379, 382

[56] References Cited

U.S. PATENT DOCUMENTS

| | | | |
|---|---|---|---|
| 4,288,659 | 9/1981 | Atalla | 178/22.08 |
| 4,304,962 | 12/1981 | Fracassi et al. | 178/22.12 |
| 4,316,055 | 2/1982 | Feistel | 178/22.06 |
| 4,317,957 | 3/1982 | Sendrow | 178/22.08 |
| 4,322,576 | 3/1982 | Miller | 178/22.17 |
| 4,384,288 | 5/1983 | Walton | 340/825.34 |
| 4,411,017 | 10/1983 | Talbot | 179/1.5 R |
| 4,418,425 | 11/1983 | Fennel, Jr. et al. | 178/22.17 |
| 4,423,287 | 12/1983 | Zeidler | 235/382 |
| 4,434,323 | 2/1984 | Levine et al. | 178/22.14 |

OTHER PUBLICATIONS

Proceedings of the IEEE, vol. 67, No. 3, Mar. 1971, p. 400, "Privacy and Authentication: An Introduction to Cryptography", pp. 397–427.

Primary Examiner—Salvatore Cangialosi
Attorney, Agent, or Firm—Peter Visserman

[57] ABSTRACT

An arrangement for generating an encryption key for use in encrypting communications between a mobile radio telephone unit and a base station is disclosed which can be readily changeable in real time. Each mobile unit is equipped with a machine-readable nonbroadcast code and the base station can access a translation table correlating the nonbroadcast code with the public directory number of the mobile unit. Upon changing frequencies, as for example, when a mobile unit moves from one geographical cell area to another, the current and previous frequencies or channel numbers are left to select sets of digit positions in the nonbroadcast code. The contents of these digit positions are then convolved and inserted into a modified version of the nonbroadcast code generated by convolving the original code with a shifted replica thereof. The key so generated may be used to encrypt communications for the use of any known encrypting circuitry.

6 Claims, 7 Drawing Figures

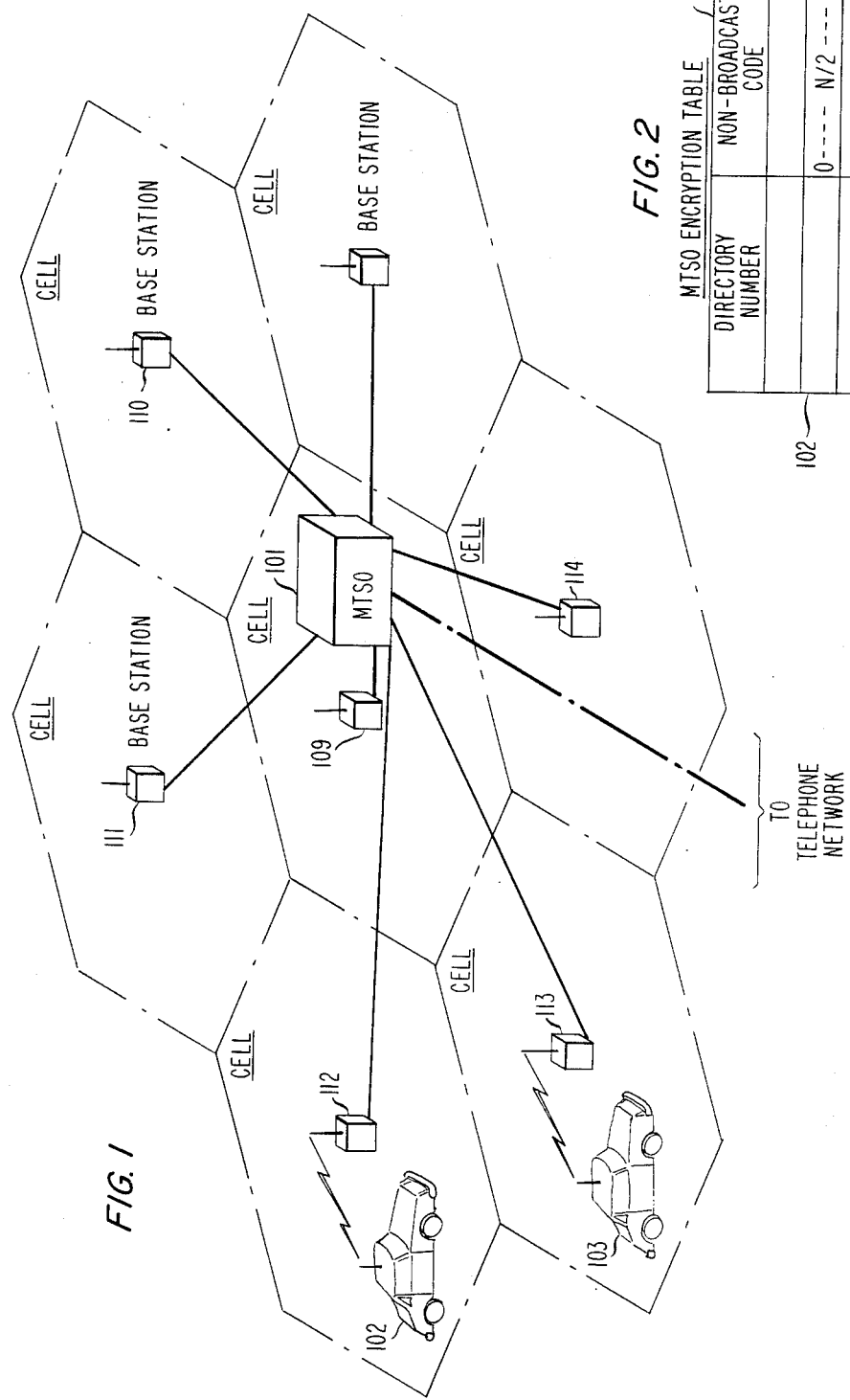

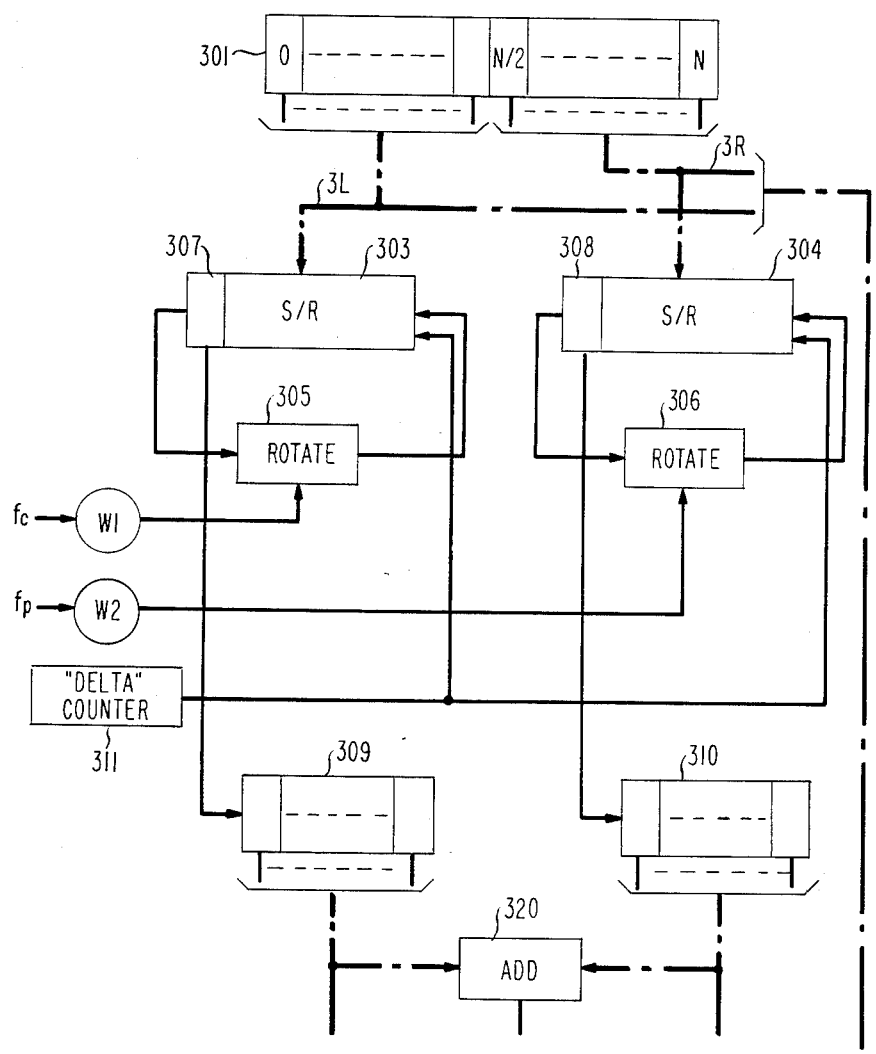

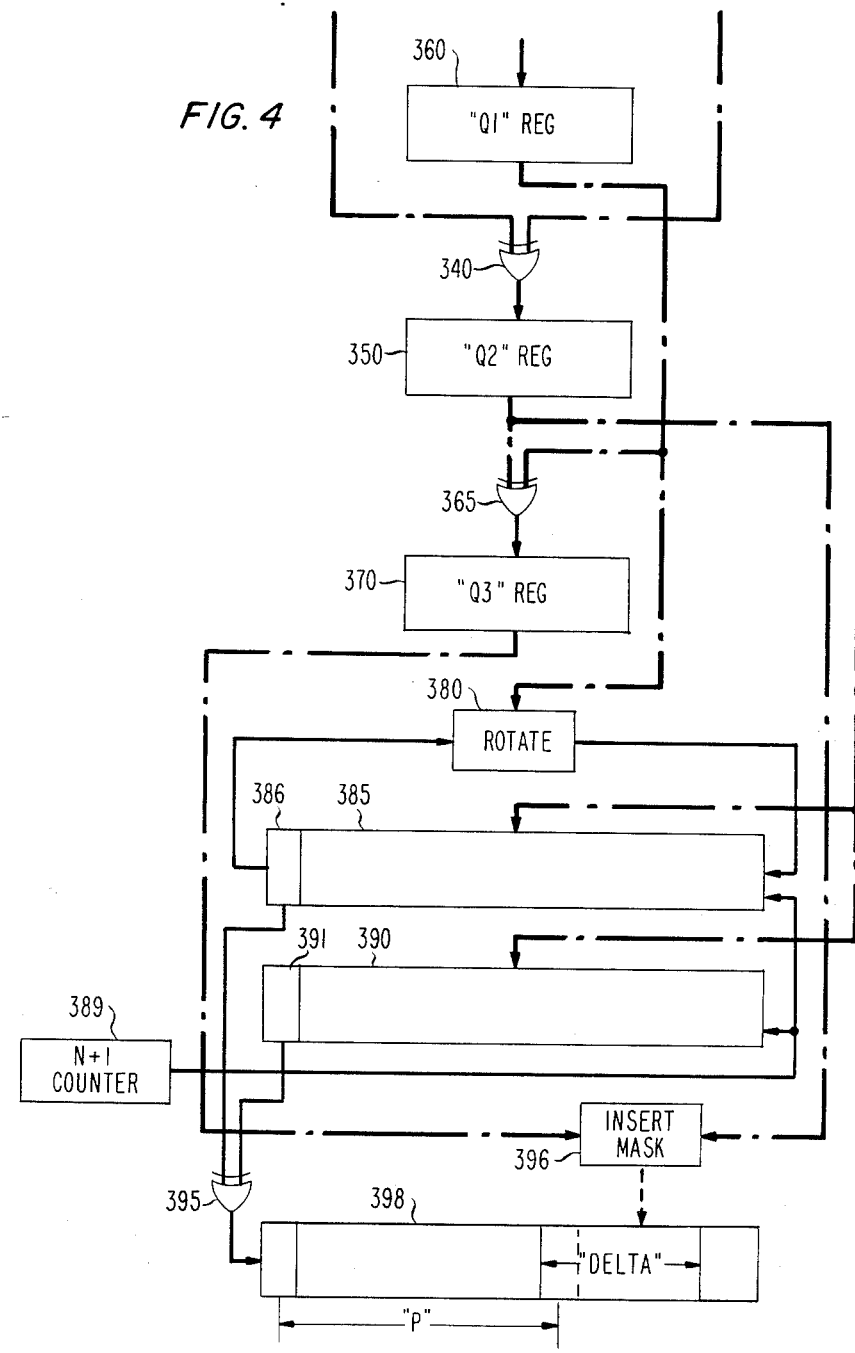

SECURE MOBILE RADIO TELEPHONY

FIELD OF THE INVENTION

This invention relates to mobile radio telephone systems and more particularly to an arrangement for enhancing the security of such systems.

BACKGROUND OF THE INVENTION

The securing of communications, especially mobile radio telephone communications, against casual or international eavesdropping suggests that the communications be encrypted. Since even encrypted communications can eventually be deciphered, a greater degree of security is obtainable if the key used for encryption is changed frequently.

Distributing new keys to a great number of mobile radio telephone units on a frequent basis has heretofore seemed to be an intractable problem. See, for example, Diffie and Hellerman, "Privacy and Authentication: An Introduction to Cryptography," *Proceedings of the IEEE* Vol. 67, No. 3, March 1979, page 400. It would of course be undesirable to transmit the new keys over the air. Moreover, in a high capacity "cellular" mobile radio telephone system such as that described in the January 1979 issue of *The Bell System Technical Journal* the new keys would also have to be distributed to the base stations in each of the cells located throughout the geographic service areas.

In a cellular radio telephone system the band of radio frequencies allocated by the federal authority is divided into different channels. A particular group of channels is assigned to each cell. This group of channels differs from the channels assigned for use by adjoining cells so that communications taking place in adjoining cells will not interfere with each other and more importantly, so that the channels in use in one cell can also be simultaneously put to use in more distant cells.

As a mobile unit leaves one cell and enters another, the new channel used by the mobile unit for communication with the base station will automatically be changed. Both the mobile unit and the base station in the new service area can be arranged to retain information concerning the identity of the channel frequency currently in use and that previously used.

SUMMARY OF THE INVENTION

In accordance with my invention, the encryption key is changed each time the frequency used for communication between a mobile radio telephone unit and a base station is changed. My system takes advantage of the fact that the identity of the channel currently in use as well as that previously in use can be stored both at the mobile radiotelephone unit and at the base station currently serving that unit. When a mobile unit and a base station are in, or are about to be in, voice communication with each other, i.e., after the initial acquisition sequence, the base station accesses an encryption table to look-up a nonbroadcast code (NBC) corresponding to the mobile units "listed" directory number. The nonbroadcast code is a unique, machine-readable pseudorandom number assigned to the mobile radiotelephone unit at its time of manufacture. The machine-readable nonbraodcast code may advantageously include the "serial number" described inter alia, in the technical specification entitled *Cellular Mobile Telephone Equipment Specification,* December 1981, published by Advanced Mobile Phone Service, Inc., 180 Mt. Airy Road, Basking Ridge, N.J. 07920.

Numbers identifying the two channels are then "mapped" to designate a set of left and right bit positions in two halves of the nonbroadcast code. An altered version of the mobile unit's nonbroadcast code is then formed by "rotating" the original nonbroadcast code by an amount specified from adding together the contents of the left and right sets of designated bit positions.

The sum of the left and right sets is entered into a register called "Q1" which has "delta" bit positions, (the same number of bit positions as there are in each of the left and right sets). The "delta" bit positions in register "Q1" are enough to contain a binary number to designate any bit position from one to "N," i.e., one less than the number of bit positions in the original NBC. However, rotation of the original NBC by up to "N" bit positions yields only "N" different patterns of the original NBC.

To increase the amount of alteration to the NBC so it can generate an encryption key that will inhibit analysis and discovery of the original NBC, the rotated NBC is exclusive-ORed with the original NBC to form a preliminary key. A digit position "P" in the preliminary key is then selected by exclusive-ORing the contents of the left and right sets taken from the original NBC and entering the result in a "delta" bit wide register, "Q2." The contents of registers "Q1" and "Q2" are exclusive-ORed and placed in register "Q3". Then "delta" of the bit positions of the preliminary key beginning with position "P" are insertion masked by the contents of register "Q3". The preliminary key with positions "P" through "P" plus "delta" so modified provides the final key that may be used to encrypt voice communications.

Accordingly, an altered version of the original nonbroadcast code is generated for use as an encryption key while the mobile unit is in operation and "distribution" of the new encryption key in initiated in "real time" simply by mapping the new and old communications channels to sets of bit positions in the nonbraodcast code. Further, the encryption system is quite secure since the underlying key, the nonbraodcast code, is never transmitted over the air.

BRIEF DESCRIPTION OF THE DRAWING

The foregoing objects and features of my invention may become more apparent from a reading of the ensuing description together with the drawing, in which:

FIG. 1 shows a pictorial representation of a high capacity cellular radiotelephone system including a plurality of base stations and a mobile telephone switching office wired to the base stations;

FIG. 2 shows an encryption table stored at a switching office of FIG. 1 for correlating each mobile radiotelephone unit's listed directory number with a confidential, respective nonbroadcast code;

FIGS. 3 and 4 taken together as shown in FIG. 5 show the logic cicruitry for altering the nonbroadcast code at a mobile unit and at the serving base station to derive an encryption key for securing communications between the mobile unit and base station.

GENERAL DESCRIPTION

Figure 6:
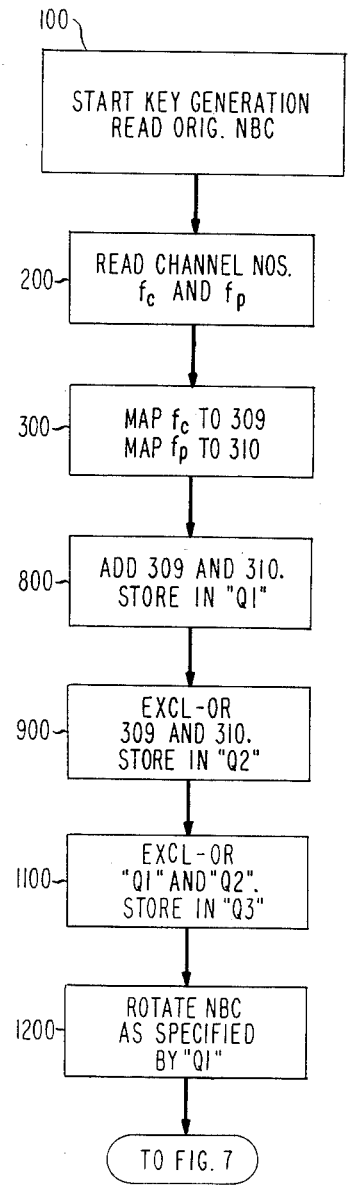
FIGS. 6 and 7 are a flow chart of the operation of the circuitry of FIGS. 3 and 4.
Figure 7:
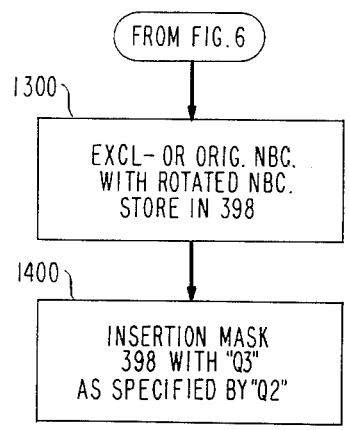

Referring now to FIG. 1, there is shown a high capacity cellular mobile radiotelephone system as described in the above mentioned January 1979 issue of *The Bell System Technical Journal*. A plurality of base stations 109 through 114 each serves a respective geographical area called a "cell." Each base station contains a radio transmitter receiver and is directly wired to mobile telephone switching office (MTSO) 101 which is a part of the nationwide network of telephone switching offices.

Each base station is assigned a group of frequencies that differs from the frequencies assigned to base stations in adjoining cells. When a mobile radiotelephone unit 102 initiates a call it will, as described in the aforementioned journal, be "acquired" by the base station 112 serving the cell area in which the mobile unit is located. When mobile unit 102 moves to an adjoining cell, see the mobile unit now labeled 103, it will be served by the base stations 113 in the new area. Base station 112 in the old cell "hands off" the communications to base station 113 in the new cell and, in doing so, a different communications channel frequency will be assigned. The reassignment of communications channel frequency is handled in such a manner as to be practically unnoticeable to the parties involved.

In accordance with my invention, each mobile telephone radio unit 102, 103, etc. will, in addition to having a listed directory number, also be assigned a confidential nonbroadcast code (NBC) number. The NBC is a pseudo-random, machine-readable number which illustratively contains 61-bit positions. Mobile telephone switching office 101 contains a table 200, shown in FIG. 2, which correlates directory numbers of mobile telephone radio units with their respective nonbroadcast codes. Table 200 will be stored as part of the data base accessible to the call processing machinery (not shown) provided at the mobile telephone switching office 101.

As a base station 112 acquires communications with a mobile telephone unit and ascertains the unit's directory number, the base station requests mobile telephone switching office 101 to provide the nonbroadcast code belonging to the mobile telephone radio unit whose directory number it has ascertained. The NBC so obtained is entered into a register 301, FIG. 3, at the base station. At the same time, the NBC is entered into a register 301 at the mobile unit. The circuitry of FIGS. 3 and 4 is provided at each mobile radiotelephone unit and at each base station. The circuitry of FIGS. 3 and 4 operates to generate a new encryption key each time the communications channel frequency between a mobile radiotelephone unit and a base station is changed.

As described in the aforementioned 1979 issue of *The Bell System Technical Journal* particularly at pages 61-68, the initial communication between the mobile radiotelephone and a base station will be over an acquisition channel frequency. Once the preliminaries have been exchanged between the mobile station and the base station and the mobile station's directory number has been furnished to the base station, a new frequency will be assigned for subsequent communications. It is assumed that it is these subsequent communication which are desired to be encrypted. Both the base station and the mobile radio station will store an indication of the frequency $f_c$ currently in use for communications and the frequency $f_p$ previously used for communication. Thus, when a communication is first established, the previous frequency $f_p$ will relate to the acquisition frequency while after a communication has been in existance for some time, the previous frequency $f_p$ will relate to the channel frequency over which the station had been in communication with the base station in the geographically preceding cell area.

The machine-readable nonbroadcast code comprises N+1 bits occupying bit positions 0 through N of register 301. The contents of the left hand half of register 301 are entered over path 3L into shift register 303 and the contents of the right hand half of register 301 are entered over path 3R into shift register 304. Registers 303 and 304 are, for the sake of simplicity, assumed to be loaded in parallel from the corresponding bit position of register 301.

The currently in-use channel frequency $f_c$ is "mapped" into a bit position of the left hand half of the nonbroadcast code by mapping operator W1 and rotate circuit 305. The previously used channel frequency $f_p$ is "mapped" into a bit position of the right half of the nonbroadcast code by mapping operator W2 and rotate circuit 306. Mapping operators W1 and W2 compute a bit position corresponding to the "fractional" positions of the particular channel number in a sequential listing of all assignable channel numbers. For example, if there are 100 channels assignable in the system, each channel may be assigned a number from 1 to 100. If the channel currently in-use, $f_c$, is channel number 25, then the digit position in the nonbroadcast code to which this channel is directly mapped by mapping operator W1 is the digit position in register 303 which is closest to being 25/100 of the distance from bit position 0 to bit position N/2. If the channel previously used, $f_p$, were channel 36, the digit position to which this channel is directly mapped is the digit position in register 304 which is closest to being 36/100 of the distance from N/2 to N.

Once the digit position has been selected in the left half register 303 by operator W1 and a digit position has been selected in the right half shift register 304 by operator W2, rotate circuits 305 and 306 operate on registers 303 and 304 respectively, to shift the select digit position into the left hand stage 307 and 308 of the respective shift register.

Once the selected digit positions are in stages 307 and 308 "delta" counter 311 causes shift registers 303 and 304 to each shift out "delta" bits of their contents into respective registers 309 and 310. The number of shift pulses, "delta", delivered by counter 311 is a fixed number large enough to define a binary number capable of designating any of N bit positions in the nonbroadcast code. If "N" is 60 bits, "delta" would have to be at least equal to 6 which is the smallest power of 2 large enough to designate any one of 60 positions in the NBC.

The "delta" bits in register 309 and the "delta" bits in register 310 are added in circuit 320 and entered into "Q1" register 360 in FIG. 4. In addition, the "delta" bits in register 309 and the "delta" bits in register 310 are exclusively-ORed by exclusive-OR circuit 340 in FIG. 4 and entered into "Q2" register 350. Both registers 360 and 350 contain "delta" bit positions.

The "delta" bits in "Q1" register 360 and the "delta" bits in "Q2" register 350 are exclusively-ORed by exclusive-OR circuit 365 and stored in "Q3" register 370. The "delta" bits in "Q3" register 370 will constitute "delta" bits in the encryption key to be finally generated in register 398. By forming the exclusive-OR of the "delta" bits in the "Q1" register and the "delta" bits in the "Q2" register, the bits in the "Q3" register when inserted into the encryption key cannot be analyzed by a code breaker to reveal any of the bits in the original nonbroadcast code.

The "delta" bits in "Q1" register 360 are applied to rotate circuit 380 associated with shift register 385. The original nonbroadcast code from register 300 is entered in parallel into both shift registers 385 and 390. Rotate in parallel into both shift registers 385 and 390. Rotate circuit 380 then rotates the contents of shift register 385 by an amount designated by the contents of "Q1" register 360. The original nonbroadcast code, in unrotated form, appears in shift register 390. At this time N+1 counter 389 applies N+1 shift pulse to each of shift registers 385 and 390 causing their contents to be shifted out of their respective left-hand stages 386 and 391 one bit at a time. Exclusive-OR gate 395 exclusively-ORs the rotated nonbraodcast code provided from stage 386 with the original nonbroadcast code provided from stage 391 and enters the convolved result into shift register 398. When shift register 398 is loaded, "delta" of its bits beginning at bit position "P" are replaced by the contents of "Q3" register 370 under the control of insertion mask circuit 396.

Insertion mask circuit 396 may be any known circuit which can receive the identity of bit position "P" from "Q2" register 350 and the identity of each of the "delta" bit positions from "Q3" register 370 and insert the bits specified in Q3 into the identified positions of register 398. Accordingly, register 398 contains the result of convolving the original nonbroadcast code with a shifted replica of the nonbroadcast code with certain bit positions of that result further modified to inhibit discovery of the underlying nonbroadcast code. The contents of register 398 may then be used as a N+1 bit key to encrypt digitized voice or other communications between a mobile unit and a base station.

While the illustrative encryption key generator has been described in the environment of a high capacity mobile radio telephone station it should be apparent that the principles of my invention are applicable to any environment in which it is desired to effect a rapid change in the encryption key without broadcasting the new key. It is simply necessary to broadcast a change key "criteria." In the illustrative embodiment, the change key "criteria" is the new channel number $f_c$ which is mapped to a digit position in one part of the original nonbroadcast code, while the previous "criteria" $f_p$ is mapped to a digit position in another part of the nonbroadcast code. It should also be appreciated that while the sets of bit positions in the nonbroadcast code have been added together in adder 320 of the illustrative embodiment, other forms of operation may be employed such as multiplication, etc. Further and other modifications will be apparent to those skilled in the art and may be implemented without, however, departing from the true spirit and scope of my invention.

What is claimed is:

1. An arrangement for generating an encryption key for a mobile radiotelephone unit capable of utilizing any of a group of predetermined communications channel frequencies and having an original, machine-readable plural-bit nonbroadcast code, comprising:
    means for forming an altered version of said original machine-readable nonbroadcast code in accordance with criteria defined by communication channel frequencies utilized by said unit, and
    means for convolving the contents of respective bit positions of said original and said altered nonbroadcast code with each other to provide said encryption key.

2. An arrangement according to claim 1 wherein said means for forming said altered version of said nonbroadcast code includes means for storing an indication of the frequency of the channel currently in use by said mobile unit and a frequency previously used by said mobile unit,
    means controlled by said storing means for identifying respective mutually-exclusive segments of said original nonbroadcast code, and
    means for convolving said segments with each other to derive a control segment.

3. An arrangement according to claim 2 wherein said means for forming said altered version of said nonbroadcast code comprises means for rotating said original nonbroadcast code in accordance with the value of said control segment.

4. An arrangement for generating an encryption key for encrypting communications between a mobile radiotelephone unit and a base station capable of communicating over any of a group of changeable communications channel frequencies, said radiotelephone unit having an original, machine-readable plural bit nonbroadcast code, comprising:
    means for storing an indication of a currently in-use one of said communications channel frequencies and of another of said communications channel frequencies,
    means responsive to each said stored indication for identifying a respective set of bit positions in said original machine-readable nonbroadcast code,
    means for performing a binary operation on the contents of each said set of bit positions to derive a further set of bit values, said further set being distinctive from each said set,
    means for providing an altered version of said machine-readable nonbroadcast code in accordance with said further set of bit values, and
    means for exclusively-ORing said original machine-readable nonbroadcast code with said altered version to produce said encryption key.

5. An arrangement for generating an encryption key for use with a mobile radiotelephone unit capable of employing any of a group of communications channel frequencies, said radiotelephone unit being equipped with an original, machine-readable plural-bit nonbroadcast code, comprising:
    means responsive to a change in said communications channel frequencies for forming an altered version of said original plural-bit nonbroadcast code, and
    means for convolving said original plural-bit nonbroadcast code with said altered version of said nonbroadcast code to provide said encryption key.

6. A method for generating an encryption key at a base station and at a remote unit from a respectively stored nonbroadcast code, comprising:
    convolving the nonbroadcast code with a shifted replica thereof to form a product, and
    replacing a predetermined number of bit positions in the convolved product with the result of convolving sets of predetermined bit positions defined by communication channel frequencies used in communications between said base station and said remote unit, in mutually exclusive portions of the nonbroadcast code.

* * * * *